US010169769B1

(12) United States Patent
Mocko

(10) Patent No.: US 10,169,769 B1
(45) Date of Patent: Jan. 1, 2019

(54) SMART GIFT CARD VALUES

(71) Applicant: Square, Inc., San Francisco, CA (US)

(72) Inventor: Christopher Lang Mocko, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 688 days.

(21) Appl. No.: 14/580,567

(22) Filed: Dec. 23, 2014

(51) Int. Cl.
 *G06Q 30/02* (2012.01)
 *G06Q 10/08* (2012.01)

(52) U.S. Cl.
 CPC ....... *G06Q 30/0205* (2013.01); *G06Q 10/087* (2013.01)

(58) Field of Classification Search
 CPC .................................................. G06Q 30/02
 See application file for complete search history.

(56) References Cited

U.S. PATENT DOCUMENTS

| | | | |
|---|---|---|---|
| 8,175,908 B1 | 5/2012 | Anderson | |
| 8,799,100 B2* | 8/2014 | Walker | G06Q 40/12 705/26.1 |
| 2003/0216969 A1 | 11/2003 | Bauer et al. | |
| 2012/0316983 A1* | 12/2012 | Shinnebarger | G06Q 30/00 705/26.7 |
| 2013/0080239 A1* | 3/2013 | Okerlund | G06Q 30/0226 705/14.33 |
| 2013/0173459 A1* | 7/2013 | Simonian | G06Q 30/00 705/39 |
| 2013/0191280 A1* | 7/2013 | Simonian | G06Q 20/354 705/41 |
| 2013/0304605 A1 | 11/2013 | Glass et al. | |
| 2014/0114741 A1* | 4/2014 | Genc-Kaya | G06Q 30/0242 705/14.41 |

OTHER PUBLICATIONS

U.S. Appl. No. 14/580,511 of Mocko, C. L., filed Dec. 23, 2014.
Non-Final Office Action dated Mar. 28, 2017, for U.S. Appl. No. 14/580,511, of Mocko, C. L., filed Dec. 23, 2014.
Final Office Action dated Nov. 16, 2017, for U.S. Appl. No. 14/580,511, of Mocko, C. L., filed Dec. 23, 2014.

* cited by examiner

*Primary Examiner* — Kurtis Gills
(74) *Attorney, Agent, or Firm* — Lee & Hayes, PLLC

(57) ABSTRACT

Techniques and arrangements for determining a recommended number gift cards for a merchant to order and for determining values for the merchant to associate with those gift cards, based, in part, on comparing a business profile generated for the merchant with collected business profiles. The business profiles may include geographical locations of the merchants, a class of items offered by the merchants, and transactional information for the merchants.

20 Claims, 12 Drawing Sheets

US 10,169,769 B1

SMART GIFT CARD VALUES

BACKGROUND

Merchants operating retail stores use a variety of sales methods to try to increase their sales. For instance, one sales method that merchants often use is selling gift cards to customers. However, for merchants, it can often be difficult to determine how many gift cards to order. For example, gift cards sales may fluctuate depending on the type of items the merchants sell, the location of the merchants, the revenue of the merchants, and the time of the year. Furthermore, even when the merchants order gift cards, merchants may have a difficult time recommending a value to associate with the gift cards to customers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
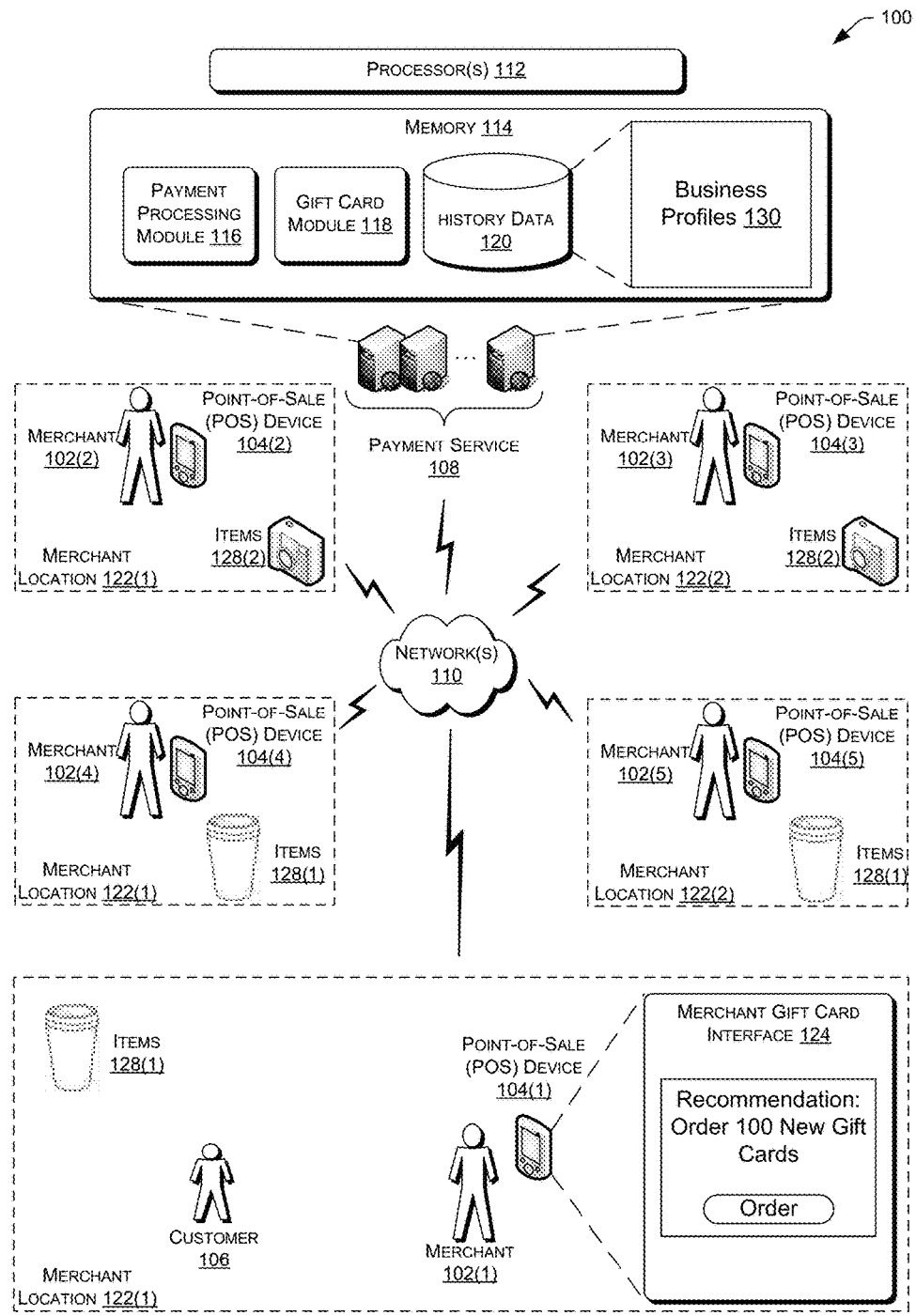
FIG. 1 illustrates an example environment that includes a merchant receiving, from a payment service, a recommendation for a number of gift cards to order. In this example, the payment service is receiving data from the merchant, creating a business profile for the merchant using the data, and then determining the number of gift cards to recommend to the merchant based on a comparison of the business profile of the merchant with collected business profiles.

Some implementations described herein include techniques and arrangements for determining a recommended number gift cards for a merchant to order and for determining values for the merchant to associate with those gift cards, based, in part, on comparing a business profile generated for the merchant with collected business profiles.

For instance, a merchant may wish to order gift cards from a payment service (or other service) that sells gift cards. In order to determine how many gift cards to order, the merchant may send, using a point-of-sale (POS) device of the merchant, data representing a geographical location associated with the merchant, a class of items offered by the merchant, and/or transactional information for the merchant. The payment service may then use the data received from the merchant to generate a business profile for the merchant. For example, the business profile for the merchant may include that the merchant is located at the geographical location, that the merchant offers the particular class of items, and the transactional information (such as historical revenue and ticket sizes) for the merchant.

After generating the business profile for the merchant, the payment service may then compare the business profile of the merchant with a collection of business profiles to identify one or more business profiles that are similar to the business profile of the merchant. For instance, the payment service may associate business profiles as similar based at least in part on the business profiles including the same or similar class of items for acquisition, including a same or similar geographical location, including historical revenues that are within a threshold revenue of each other (e.g., within a particular percentage or range of each other), including similar ticket sizes (or within a percentage or range), and/or the like. When associating business profiles as similar, the payment service may further give business profiles a similarity score and use the similarity score to identify similar business profiles, which is discussed in detail below.

For example, the payment service may identify one or more business profiles that are similar to the business profile of the merchant based on the one or more business profiles including a similar geographical location (at or near) as the business profile of the merchant. For a second example, the payment service may identify one or more business profiles that are similar to the business profile of the merchant based on the one or more business profiles including a similar class of items as the business profile of the merchant. For a third example, the payment service may identify one or more business profiles that are similar to the business profile of the merchant based on the one or more business profiles including a similar historical revenue (either based on a percentage or range) as the business profile of the merchant. Furthermore, the payment service may combine one or more of the examples above (e.g., geographical location, class of goods, and/or historical revenue) to identify one or more business profiles that are similar to the business profile of the merchant.

After identifying one or more business profiles that are similar to the business profile of the merchant, the payment service may then use the one or more business profiles to determine a recommended number of gift cards to suggest to the merchant to order. For example, the payment service may determine how many gift cards merchants order (such as an average) that are associated with the one or more business profiles that are similar to the business profile of the merchant and recommend that the merchant order a similar number of gift cards. For another example, the payment service may determine how many gift cards the merchants sell (such as an average) that are associated with the one or more business profiles that are similar to the business profile of the merchant and recommend that the merchant order a similar number of gift cards. When recommending the number of gift cards, the recommended number may be for a given time period (e.g., week, month, year, etc.) and the payment service may recommend that the merchant order a similar number of gift cards at the end of each time period (e.g., at the end of each week, month, year, etc.).

After determining the number of gift cards to recommend to the merchant, the payment service may then send, to a device such as the POS device of the merchant, a message that indicates the recommended number of gift cards. Furthermore, the payment service may receive, from the POS device, an order for the number of gift cards (or for another number of gift cards).

For instance, the payment service may send, to the POS device, a message recommending that the merchant order a number of gift cards for a given time period (e.g., week, month, year, etc.). The merchant may then use the POS device to send, to the payment service, an order for the recommended number of gift cards. Later, the payment service may determine that the given time period will elapse within a threshold amount of time (e.g., within a given number of days, within a delivery time for gift cards to get to the merchant, etc.). In response to determining the given time period is about to elapse, the payment service may send, to the POS device, an additional message to again order the number of gift cards.

In the examples above, for instance, envision that a merchant is opening up a coffee stand in Spokane, Wash. and wishes to order gift cards from the payment service so that the merchant can offer the gift cards to customers at the time of opening the coffee stand. The merchant may then use a POS device of the merchant to send, to a payment service, data indicating that the merchant is opening up a coffee stand in Spokane, Wash. In response to receiving the data from the merchant, the payment service may then generate a business profile for the merchant that includes the merchant's business is a coffee stand, the class of items that the merchant offers is coffee, and that the merchant is located in Spokane, Wash.

After generating a business profile for the merchant, the payment service may then compare the business profile of the merchant with a collection of business profiles to identify one or more business profiles that include a business of coffee stand, a class of items of coffee, and/or a location of Spokane, Wash., nearby Spokane, Wash., or a city or area deemed similar (e.g., in size, climate, etc.) as Spokane, Wash. For example, the payment service may identify a business profile that includes coffee shops in Spokane, Wash. The payment service may then determine the average number of gift cards that merchants order each month that are associated with the identified business profile is fifty gift cards. Finally, the payment service sends, to the POS device of the merchant, a recommendation to order fifty gift cards every month, or a number based on this average number of fifty gift cards.

In the example above, now suppose that the merchant's coffee stand has been open for six months and during the six months the POS device has been sending the payment service transactional information, such as the revenue of the merchant and sales of the gift cards at the merchant's coffee stand. The payment service may then adjust the recommendation it sends to the merchant each month based on revenue and/or the sales of the gift cards. For example, the payment service may update the business profile of the merchant to now include a historical revenue of the merchant, identify new business profiles that are similar to the updated business profile of the merchant, and adjust the recommendation for gift cards based on the new business profiles. For another example, the payment service may use the sales of the gift cards at the merchant and adjust the recommendation based on the sales. In either example, the payment service may use updated information about the merchant to make sure that the payment service is sending the merchant recommendations that best fit the merchant's business.

In the examples above, the payment service may generate the collected business profiles using a number of methods. For instance, the payment service may receive data from merchants, where the data includes one or more of geographical locations associated with the merchants, classes of items offered by the merchants, transactional information for the merchants, and/or the like. The payment service may then use the data it receives from the merchants to generate the collected business profiles.

For instance, the payment service may generate business profiles that each include one or more of a specific geographical location, a specific class of offered items, and/or specific transactional information. When generating the business profiles, the geographical location may comprise a country, state, city, region, street address, city size, weather, demographics or the like. The class of items may comprise physical goods (e.g., food, coffee, electronic devices, sporting equipment, clothes, clothing accessories, etc.), a representation of digital goods (e.g., a video, a song, etc.), or a representation of a service (e.g., a seat at a restaurant, a massage, etc.). Furthermore, transactional information may comprise a historical revenue (or range), ticket sizes associated with purchases from customers (e.g., minimum ticket size, average ticket size, maximum ticket size, etc.), order data that represents gift card orders (e.g., orders per day, month, year, etc.), sales data that represents sales of gift cards (e.g., sales per day, month, year, etc.), or the like.

For the example, one business profile may comprise coffee shops (class of items) in Spokane, Wash. (geographical location) that have a yearly revenue of between $100,000 and $200,000 (transactional information). For another example, a second business profile may comprise bagel shops (class of items) in Washington State (geographical location) that have a yearly revenue between $500,000 and $750,000 (transactional information). For a third example, a third business profile may comprise sporting goods stores (class of items) on the East Coast of the United States (geographical location) that have a yearly revenue between $5,000,000 and $7,500,000 (transactional information).

By generating a variety of different business profiles using the data received from the merchants, the payment service is able to identify at least one business profile that is similar to the business profile of the merchant. The payment service is further able to determine the number of gift cards that the merchant should order using that at least one business profile. For instance, the payment service may determine the number of gift cards for the merchant to order based on gift card orders and/or gift card sales of other merchants that are associated with the similar business profile. Merchants may be associated with the similar business profile when merchants are located in the geographical location identified in the similar business profile, sell a similar class of items as identified in the similar business profile, and/or have transactional information that is similar to the transactional information identified in the similar business profile.

For example, the payment service may determine that merchants that are associated with a business profile that includes coffee shops (class of items) in Spokane, Wash. (geographical location) that have a yearly revenue between $100,000 and $200,000 (transactional information) order an average of fifty gift cards a month. The payment service may then recommend that any merchant that includes a similar business profile also order fifty gift cards (or a percentage or range around fifty gift cards) per month. For another example, the payment service may determine that merchants that are associated with a business profile that includes bagel shops (class of items) in Washington State (geographical location) that have a yearly revenue between $500,000 and $750,000 sell an average of sixty gift cards a month. The payment service may then recommend that any merchant that includes a similar business profile order sixty gift cards (or a percentage or range around sixty gift cards) per month.

Additionally, the payment service may use a variety of methods to determine the number of gift cards that the merchant should order using the collected business profiles. For instance, and as above discusses, the payment service may use the average number of gift cards that merchants order (or sell) that are associated with the one or more business profiles that are similar to the business profile of the merchant. Additionally or alternatively, however, the payment service may further build in a statistical margin of safety for gift card orders for merchants.

For instance, the payment service may determine (based on sales data for the merchants and/or ticket sizes for the merchants) that the average number of gift cards that merchants order (or sell) that are associated with a business profile is not a sufficient number of gift cards for one or more of the merchants. The payment service may then build a statistical margin of safety into that business profile that the payment services then uses when determining a number of gift cards for a merchant to order. For example, the payment service may determine that the merchant should only order half of the average number of gift cards that merchants associated with the business profile order (or sell) based on the statistical margin of safety built into the business profile. For another example, the payment service may determine that the merchant should order twice the average number of gift cards that merchants associated with the business profile order (or sell) based on the statistical margin of safety built into the business profile.

Additionally or alternatively, when determining the number of gift cards for a merchant to order, the payment service may use ticket sizes for merchants that are associated with the one or more business profiles that are similar to the business profile of the merchant. For instance, the payment service may determine that the merchants associated with the one or more similar business profiles include a higher than average ticket size (e.g., amounts associated with customer transactions are higher than average, amounts associated with gift card purchases are higher than average, etc.) than other merchants. The payment service may use the ticket sizes for the merchants to determine the number of gift cards for the merchant to order. For example, the payment service may determine that the merchant should order a greater number of gift cards so that the merchant always has gift cards in stock for customers that purchase gift cards for higher than average amounts.

Additionally or alternatively, in the examples above, to identify at least one business profile that is similar to the business profile of the merchant, the payment service may use a similarity score (or value) for each of the business profiles. For instance, the payment service may calculate a similarity score for each of the business profiles based on how closely related the business profiles are to the business profile of the merchant. In calculating the similarity scores, the payment service may score one or more of the geographical location included in the business profiles, the class of items included in the business profiles, and/or the transactional information included in the business profiles to determine how closely related the business profiles are to the business profile of the merchant.

For example, a first business profile that includes the same geographical location (a first score) and class of items (plus a second score) as the business profile of the merchant may include a higher similarity score than a second business profile that only includes the same geographical location (the first score) as the business profile of the merchant. For another example, a first business profile that includes the same geographical location (a first score), the same class of items (plus a second score), and a historical revenue that is within a threshold revenue as the business profile of the merchant (plus a third score) may include a higher similarity score than a second business profile that only includes the same geographical location (the first score) and the same class as items (plus the second score) as the business profile of the merchant.

As such, the payment service may determine the similarity scores based on the business profiles including one or more items of data (e.g., geographical location, class of items, transactional information, etc.) that are the same as or similar to the data included in the business profile of the merchant. Furthermore, the payment service may give more weight to one or more of the items of data (e.g., geographical location, class of items, transactional information, etc.) than to other items of data when determining the similarity scores. For instance, the payment service may give a higher similarity score (value) to business profiles that include the same or similar class of items as the business profile of the merchant than business profiles that include the same or similar geographical location as the business profile of the merchant.

After determining a similarity score for each of the business profiles, the payment service may then use the similarity scores to identify the one or more business profiles that are similar to the business profile of the merchant. For instance, the payment service may identify business profiles as being similar to the business profile of the merchant when the similarity score for the business profiles is greater than a similarity threshold. The payment service may calculate the similarity threshold using a similar method as the similarity score for business profiles described above.

For instance, the payment service may set the similarity threshold at a score of zero. By setting the similarity threshold at a score of zero, the payment service will identify any business profile that includes a similarity score that is greater than zero to be similar to the business profile of the merchant. For example, the payment service may identify any business profile that includes one or more of the same or similar geographical location as the business profile of the merchant (a first score), the same or similar class of items as the business profile of the merchant (a second score), and/or the same or similar transactional information as business profile of the merchant (and/or a third score) as being similar to the business profile of the merchant.

Additionally, the payment service may set the similarity threshold to be greater than zero so that the payment service only identifies business profiles that are very similar to the business profile of the merchant. For example, the payment service may set the similarity threshold to a score that corresponds to business profiles including at least the same or similar geographical location (a first score) and the same or similar class of items (plus a second score) as the business profile of the merchant. Therefore, the payment service will not identify business profiles that only include the same or similar geographical location (the first score) as the business profile of the merchant, or business profiles that only include the same or similar class of items (the second score) as the business profile of the merchant, as being similar to the business profile of the merchant. This is because the similarity score for such business profiles will not be greater than the similarity threshold.

While the above provides one example, the described techniques may consider other factors when determining a number of gift cards for merchants to order. For instance, the payment service may consider special events that increase or decrease the sales of gift cards when determining the number of gift cards for a merchant to order. Special events may include holidays (e.g., Christmas, Valentine's Day, Mother's Day, Father's Day, etc.) or just times of the year when gift card sales increase or decrease. For instance, the payment service may determine that an event is coming up (based on the time of year, the one or more similar business profiles, and/or all of the business profiles) that increases the sales of gift cards at merchants. The payment service may then send, to the POS device of the merchant, a recommendation that the merchant order additional gift cards before the event so that the merchant receives the gift cards by the time of the event, and/or the payment service may automatically order the additional gift cards for the merchant.

When recommending additional gift cards to the merchant for an event, the payment service may further send, to the POS device of the merchant, recommendations for specially designed gift cards that correspond to the event. For instance, if the event is a holiday, such as Christmas, the recommendation for specially designed gift cards may include gift cards that have a Christmas theme.

Furthermore, the techniques described above may account for still additional factors when recommending the number of gift cards for the merchant to order. For instance, the payment service may consider the type of customers that purchase items at the merchant and/or the type of gift cards that customers purchase from the merchant. For example, the payment service may consider whether the customers of the merchant are repeat customers (as opposed to mostly new customers) since repeat customers may be more likely to purchase gift cards. For another example, the payment service may consider whether the gift cards are one-time use gift cards (as opposed to reloadable gift cards) since sales will probably be greater for one-time use gift cards (as opposed to customers just reloading the reloadable gift cards).

Furthermore, the techniques described above may account for still additional factors when recommending the number of gift cards for the merchant to order. For instance, the payment service may consider if the merchant's business is part of a franchise and if so, how many other locations there are near the merchant. The payment service may then recommend, based at least in part on how many other locations are near the merchant, that the merchant order a greater number of gift cards. The payment service may recommend the greater number of gift cards since customers may be more likely to purchase gift cards from the merchant when the customers know they can use the gift cards at more than one location.

Besides just recommending a number of gift cards for the merchant to order, the payment service may further monitor gift card sales at the merchant. For instance, the payment service may determine when a number of gift cards remaining at the merchant falls below a threshold number of gift cards and in response, the payment service may then recommend that the merchant order additional gift cards. For example, the payment service may receive, from the POS device of the merchant, requests to activate gift cards as customers purchase the gift cards from the merchant. The payment service may then determine that the number of gift cards remaining at the merchant is below a threshold number. Finally, the payment service may either send, to the POS device, a recommendation to order additional gift cards and/or the payment service may automatically order the additional gift cards for the merchant so that the merchant does not run out of gift cards.

In the example above, the payment service may determine the threshold number of gift cards based on the number of remaining gift cards the merchant currently has in stock, the sales rate for gift cards at the merchant (such as sales per day, week, month, etc.), how long it takes to deliver gift cards to the merchant, and/or how long it is until the merchant receives his next recommendation for a gift card order (if the payment service sends the merchant suggested gift card orders at regular time intervals).

For example, the payment service may determine that the merchant has fifty gift cards remaining in stock, the merchant sells ten gift cards a day on average, it takes four days for the merchant to receive gift card orders, and that the merchant is not set to order additional gift cards for two weeks. The payment service may then send, to the POS device of the merchant, a recommendation that the merchant order additional gift cards that day so that the additional gift cards arrive at the merchant before the merchant runs out of gift cards in five days. Additionally, the payment service may automatically order the additional gift cards for the merchant (if the merchant authorizes the payment service to do so) so that the merchant receives the additional gift cards before the remaining gift cards at the merchant run out.

Besides just recommending gift card orders for the merchant, the payment service may further recommend how to display the gift cards at a physical establishment of the merchant. For instance, the payment service may determine how other merchants associated with the one or more business profiles that are similar to the business profile of the merchant display gift cards at their physical establishments. The payment service may then send, to the POS device of the merchant, recommendations on how to display the gift cards that the merchant orders from the payment service based at least in part on the one or more similar business profiles. The payment service recommends the display configurations to ensure that sales of the gift cards at the merchant meet expected sales for the gift cards, based on the one or more business profiles.

For instance, the payment service may receive, from the POS device of the merchant, requests to activate the gift cards. The payment service may then determine that sales for the gift cards are below expected sales for the gift cards at the merchant, where the expected sales for gift cards includes a total number of gift cards that the payment service expects the merchant to sell. For example, the payment service may determine the expected sales for gift cards at the merchant as a number of gift cards the merchant should sell per given time period (e.g., per day, week, month, year, etc.). For another example, the payment service may determine the expected sales of gift cards at the merchant based on a number of gift cards that the merchant should sell per given number of transactions that the merchant has with customers (e.g., one gift card for every ten transactions).

In response to determining that the sales of the gift cards at the merchant are below the expected sales, the payment service may then flag the business profile of the merchant. Furthermore, the payment service may send, to the POS device of the merchant, recommendations on how to display the gift cards at the physical establishment of the merchant. For instance, the payment service may recommend that the merchant display gift cards using similar methods as other merchants that are associated with business profiles that are similar to the business profile of the merchant.

Using the example above, for instance, envision that the payment service receives, from the POS device of the merchant, requests to activate gift cards each time the merchant that owns the coffee stand in Spokane, Wash. sells a gift card to a customer. While receiving the requests from the merchant, the payment service will then monitor the sales of the gift cards to make sure the merchant is selling an expected number of gift cards. For example, the payment service may use the business profile of the merchant to determine that an expected sales rate for gift cards for the merchant is one gift card for every five transactions that the merchant has with customers. If the payment service then determines that merchant is only selling one gift card for every ten transactions that the merchant has with customers, the payment service may send, to the POS device of the merchant, recommendations on how to display gift cards at the physical establishment of the merchant.

For instance, the payment service may recommend that the merchant use a gift card display that other merchants use in their physical establishments to display gift cards. Furthermore, the payment service may recommend a location in the physical establishment of the merchant to place the gift cards, such as by the POS device or by the front door of the physical establishment.

Additionally, the payment service may further recommend, to the merchant, values to associate with the gift cards (e.g., values that customers purchase the gift cards for and/or values that the customers load onto the gift cards at the time of activating the gift cards). For instance, the payment service may determine, based on the business profile of the merchant and/or the one or more business profiles that are similar to the business profile of the merchant, values for the merchant to associate with gift cards that customers purchase from the merchant. The payment service may then send, to the POS device of the merchant, the recommended values to associate with the gift cards. In response to receiving the recommended values from the payment service, the merchant may then use the recommended values when selling gift cards to customers. For instance, the merchant may either sell the gift cards for at least one of the recommended values and/or the merchant may suggest to customers that are purchasing gift cards that the customers purchase the gift cards for one of the recommended values.

For instance, at the time of and/or after the merchant orders the gift cards from the payment service, the payment service may determine values that similar merchants associate with gift cards and recommend those values (or a percentage or range around those values) to the merchant. For example, the payment service may use the one or more business profiles that are similar to the business profile of the merchant to determine that merchants associated with those one or more business profiles usually sell their gift cards for $50, $75, or $100. The payment service may then send, to the POS device of the merchant, a recommendation that the merchant offers gift cards for $50, $75, or $100. The payment service may then receive, from the POS device, one or more requests to activate gift cards for customers for one of the recommended values.

When determining recommended values for the merchant to associate with gift cards, the payment service may use a ticket size (with or without taxes, shipping, or the like included) that is associated with merchant, where ticket sizes comprise purchase amounts that previous customers have spent at the merchant. For instance, the payment service may use at least one of a minimum ticket size, an average ticket size, a maximum ticket size, a median ticket size, a multiple of the maximum ticket size, a standard deviation of ticket sizes, or the like of the merchant when determining one or more recommended values for the merchant to associate with gift cards.

Furthermore, the payment service may use ticket sizes associated with merchants that are similar to the merchant when determining recommended values for the merchant to associate with gift cards. For instance, and as discussed above, the collected business profiles may include transactional information, which includes ticket sizes (e.g., minimum ticket size, average ticket size, maximum ticket size, etc.) associated with merchants that are associated with each of the collected business profiles. The payment service may then use the ticket sizes from at least one business profile that is similar to the business profile of the merchant when determining the recommended values for the merchant. For example, the payment service may use at least one of a minimum ticket size, an average ticket size, a maximum ticket size, a median ticket size, a multiple of the maximum ticket size, a standard deviation of ticket sizes, or the like from the at least one similar business profile when determining the recommended values.

Additionally or alternatively, besides recommending values for the gift cards that the merchant orders as a whole, the payment service may further recommend values for the merchant to suggest on a per customer basis. For instance, the payment service may receive, from the POS device of the merchant, a request to activate a gift card for a particular customer at the time of the particular customer purchasing the gift card from the merchant. In response to receiving the request, the payment service may determine one or more recommended values for the merchant to suggest to the particular customer using the above methods. The payment service may then send, to the POS device, the recommended values for the particular customer.

When determining recommended values for a particular customer, the payment service may use additional factors. For instance, the payment service may use data that is specific to the particular customer, which the payment service may collect from previous transactions with the particular customer. For example, the data may include a location associated with where the particular customer lives, a salary for the particular customer, transactional information for the particular customer (e.g., previous ticket sizes for the particular customer with the merchant and/or other merchants), and/or the like. The payment service may then use the data for the particular customer when determining the recommended values for the particular customer.

For example, the payment service may determine the annual salary for a particular customer based on data that the payment service collects for the particular customer. The payment service may then determine the recommended values for the merchant to suggest to the particular customer based at least in part on the annual salary for the particular customer. For another example, the payment service may determine tickets sizes (e.g., transaction amounts) for the particular customer with one or more merchants based on data that the payment service collects for the particular customer. The payment service may then determine the recommended values for the merchant to suggest to the particular customer based at least in part on the ticket sizes for the particular customer.

As a note, the above discusses the merchant using a POS device to communicate with the payment service to determine a recommended number of gift cards to order and/or values to associate with gift cards, however, the merchant may communicate with the payment service using other methods. For instance, the payment service may host an online service (e.g., webpage) that the merchant joins by creating a merchant account. The merchant may then use the online service to input the data described above manually. The customer service may then send the recommendations to the merchant using the online service and/or the payment service may send the recommendations to a device (e.g., cell phone, computer, etc.) of the merchant.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Figure 9:
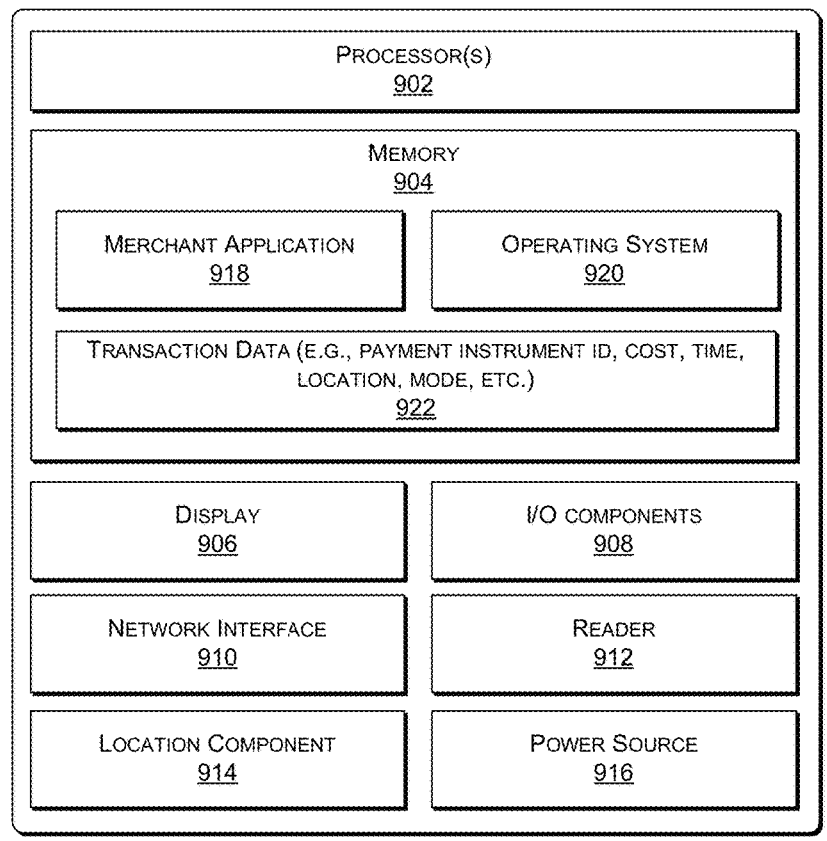
FIG. 9 illustrates select components of a POS device that a merchant described herein may utilize.

FIG. 1 illustrates an example environment 100 that includes a merchant 102(1) operating a point-of-sale (POS) device 104(1) to engage in various transactions with respective customers, such as customer 106 (and similarly, but not discussed as in much detail below, merchant 102(2)-(5) operating POS device 104(2)-(5) to engage in various transactions with customers). The POS device 104(1) may comprise any sort of mobile or non-mobile device that includes an instance of a merchant application that executes on the respective device (as illustrated in FIG. 9). The merchant application may provide POS functionality to the POS device 104(1) to enable the merchant 102(1) (e.g., an owner, employees, etc.) to accept payments from the customer 106. In some types of businesses, the POS device 104(1) may correspond to a store or other place of business of the merchant, and thus, may be a fixed location that typically does not change on a day-to-day basis. In other types of businesses, however, the POS device 104(1) may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of items (goods and/or services) that is conducted between a customer and a merchant. For example, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 104(1) to process the transaction, such as by inputting (e.g., manually, via a magnetic card reader or an RFID reader, etc.) an identifier associated with the payment instrument. For example, a payment instrument of the customer 106 may include one or more magnetic strips for providing card and customer information when swiped in a card reader. In other examples, other types of payment cards may be used, such as smart cards having a built-in memory chip that is read by the POS device 104(1) when the card is "dipped" into the reader, a radiofrequency identification tag, or so forth.

During the transaction, the POS device 104(1) can determine transaction information describing the transaction, such as the identifier of the payment instrument, an amount of payment received from the customer, the item(s) acquired by the customer, a time, place and date of the transaction, a card network associated with the payment instrument, an issuing bank of the payment instrument, and so forth. The POS device 104(1) can send the transaction information to a payment service 108 over a network 110, either substantially contemporaneously with the conducting of the transaction (in the case of online transactions) or later when the device 104(1) is in the online mode (in the case offline transactions).

In an offline transaction, the POS device 104(1) may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with one of the customers, the POS device 104(1) may provide the stored information to the payment service 108 over the network 110. The network 110 may represent any one or more wired or wireless networks, such as a WiFi network, a cellular network, or the like. In an online transaction, the POS device 104(1) may send this information to the payment service 108 over the network 110 substantially contemporaneously with the transaction with the customer.

As illustrated, the payment service 108 may include one or more processors 112 and memory 114, which may store a payment-processing module 116, a gift card module 118, and historical data 120 storing different business profiles 130 for merchants, such as merchants 102(1)-(5).

The payment processing module 116 may function to receive the information regarding a transaction from the POS device 104(1) and attempt to authorize the payment instrument used to conduct the transaction, as described above. The payment processing module 116 may then send an indication of whether the payment instrument has been approved or declined back to the POS device 104(1).

When a customer and a merchant enter into an electronic payment transaction, the transaction is processed by electronically transferring funds from a financial account associated with the customer to a financial account associated with the merchant. As such, the payment processing module 116 may communicate with one or more computing devices of a card network (or "card payment network"), e.g., MasterCard®, VISA®, over the network 110 to conduct financial transactions electronically. The payment processing module 116 can also communicate with one or more computing devices of one or more banks over the network 110. For example, the payment processing module 116 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In some instances, the payment service 108 may send, to the POS device 104(1) of the merchant 102(1), a recommendation for a number of gift cards that the merchant 102(1) should consider ordering from the payment service 108 and/or an additional service that sells gift cards. FIG. 1, for instance, illustrates an example where the payment service 108 first generates business profiles 130 using data that it is receiving from the POS devices 104(2)-(5) of additional merchants 102(2)-(5). The data may include the geographic locations of the merchants 102(2)-(5), the class of items that the merchants 102(2)-(5) offer, and/or transactional information for the merchants 102(2)-(5).

For example, data for the merchant 102(2) may include a geographical location at location 122(1) (e.g., city, state, country, etc.), a class of items 128(2) (e.g., electronics), and transactional information for the merchant 102(2). Data for the merchant 102(3) may include a geographical location at location 122(2), a class of items 128(2), and transactional information for the merchant 102(3). Data for the merchant 102(4) may include a geographical location at location 122(1), a class of items 128(1) (e.g., coffee), and transactional information for the merchant 102(4). Finally, data for the merchant 102(5) may include a geographical location at location 122(2), a class of items 128(1), and transactional information for the merchant 102(5).

At the same time as the payment service 108 receives the data from the merchants 102(2)-(5), the payment service 108 may further generate one or more business profiles 130 using the data that it receives from the merchants 102(2)-(5). For instance, a first of the business profiles 130 may include merchants that sell the class of items 128(2) (such as merchants 102(2) and 102(3)), while a second of the business profiles 130 may include merchants that sell the class of items 128(1) (such as merchants 102(4) and 102(5)). Furthermore, a third of the business profiles 130 may include merchants that include a geographical location at location 122(1) (such as merchants 102(2) and 102(4)), while a fourth of the business profiles 130 may include merchants that include a geographical location at location 122(2) (such as merchants 102(3) and 102(5)). Finally, a fifth of the business profiles 130 may include merchants that sell the class of items 128(1) and include a geographical location at location 122(1) (such as merchant 102(4)).

In the example of FIG. 1, the payment service 108 may further be receiving data from the POS device 104(1) of the merchant 102(1). The data for the merchant 102(1) may include a geographical location at location 122(1), that the merchant sells a class of items 128(1), and/or transactional information for the merchant 102(1) if the merchant 102(1) has been in operation for a given period of time. The payment service 108 may then use the data it receives from the merchant 102(1) to generate a business profile for the merchant 102(1). For instance, the business profile for the merchant 102(1) may include a geographical location at location 122(1), a class of items 128(1), and/or transactional information for the merchant 102(1).

After generating the business profile for the merchant 102(1), the payment service 108 then identifies one or more of the business profiles 130 that are similar to the business profile for the merchant 102(1). For instance, the payment service 108 may identify one or more business profiles 130 that include a similarity with the business profile of the merchant 102(1) that is greater than a similarity threshold. For example, the payment service 108 may identify the second one of the business profiles 130 as including a similarity to the business profile of the merchant 102(1) that is greater than a similarity threshold since both business profiles include a similar class of items 128(1). The payment service 108 may further identify the third of the business profiles 1310 as including a similarity to the business profile of the merchant 102(1) that is greater than a similarity threshold since both business profiles include a geographical location at location 122(1). Finally, the payment service may additionally identify the fifth of the business profiles 130 as including a similarity to the business profile of the merchant 102(1) that is greater than a similarity threshold since both business profiles include a similar class of items 128(1) and a geographical location at location 122(1).

Next, using one or more of the similar business profiles 130, the payment service 108 determines a number of gift cards to recommend to the merchant 102(1) to order. For instance, the payment service 108 may use the fifth of the business profiles 130 to determine a number of gift cards to recommend to the merchant 102(1) to order. In using the fifth of the business profiles 130, the payment service 108 may determine that merchants (such as merchant 102(4)) that are associated with the fifth of the business profiles 130 order (or sell) one hundred gift cards a month on average. The payment service 108 may then send, to the POS device 104(1), a recommendation that the merchant 102(1) to order one hundred gift cards each month, as illustrated in FIG. 1.

Besides just using the fifth of the business profiles 130, the payment service 108 in FIG. 1 could further use one or more additional business profiles 130 to determine the number of gift cards to suggest to the merchant 102(1) to order. For instance, the payment service 108 may use the second and the fifth business profiles 130 to determine the number of gift cards to suggest to the merchant 102(1) to order. When using more than one of the business profiles 130, the payment service 130 may determine an average number of gift cards to order for each of the business profiles 130. The payment service 130 may then determine a recommended number of gift cards for the merchant 102(1) by taking an average for the business profiles 130, taking a weighted average based on which of the business profiles 130 includes a greater similarity (e.g., score) to the business profile of the merchant 102(1), or the like.

Also illustrated in the example of FIG. 1, in response to receiving the recommended number of gift cards from the payment service 108, the POS device 104(1) of the merchant 102(1) displays a merchant gift card interface 124 that includes the recommendation. For instance, as illustrated in FIG. 1, the merchant gift card interface 124 recommends that the merchant 102(1) order the one hundred gift cards. The merchant gift card interface 124 further includes an "order" button that the merchant 102(1) can use to order the gift cards. For instance, when the merchant 102(1) uses the "order" button on the merchant gift card interface 124, the POS device 102(1) sends, to the payment service 108, an order for the one hundred gift cards.

The example of FIG. 1 only illustrates five merchants 102(1)-(5), however, the payment service 108 may receive data from any number of merchants. For instance, the payment service 108 may receive data from a thousand merchants and use that data to generate the business profiles 130. The payment service 108 may then use the business profiles 130 generated using the data from the thousand merchants when determining a recommended number of gift cards for the merchant 102(1) to order.

Figure 2:
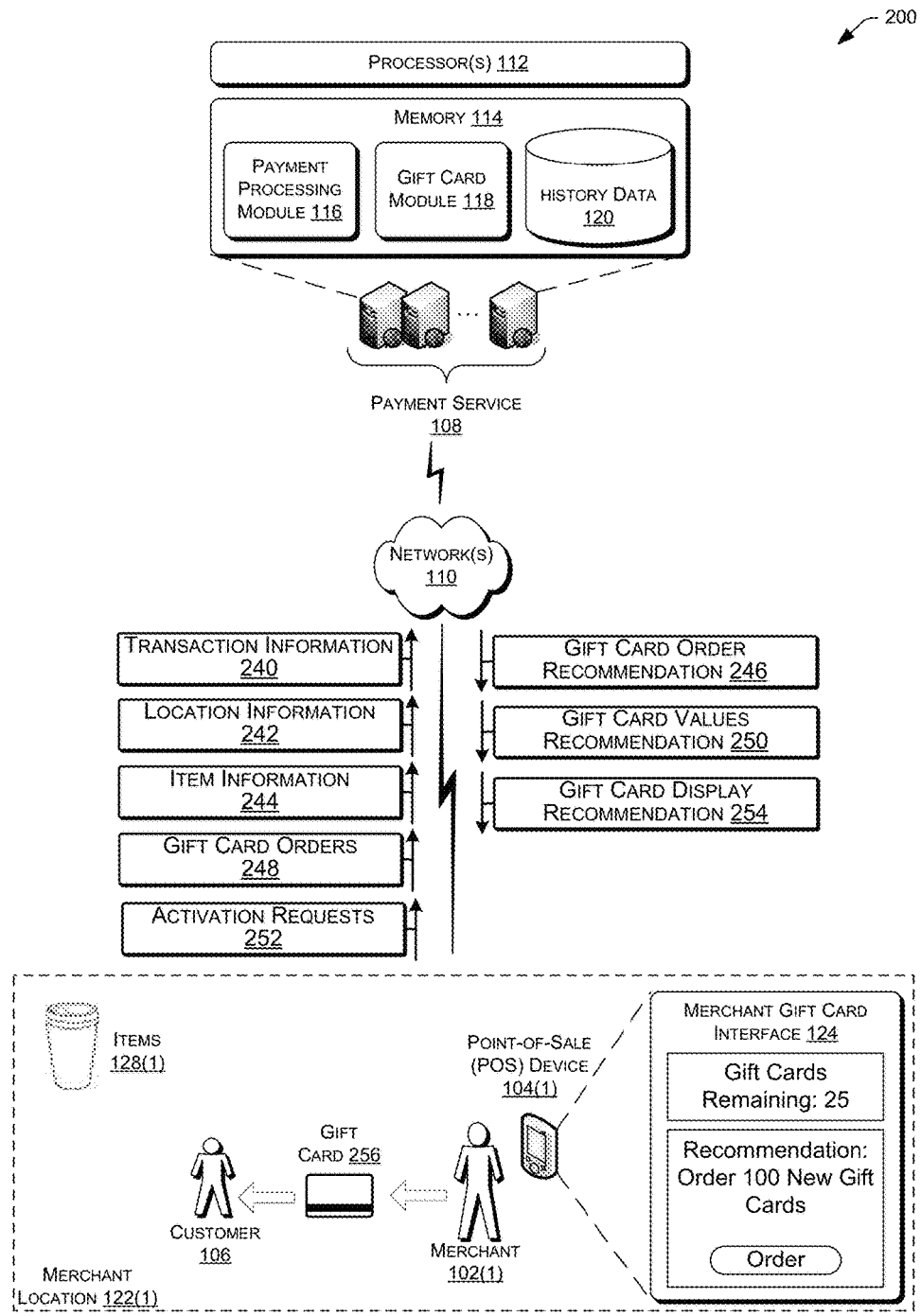
FIG. 2 illustrates an example that includes a merchant sending data to a payment service and in response, receiving recommendations from the payments service. In this example, the payment service is recommending gift card orders, gift card values, and gift card displays to the merchant.

FIG. 2 illustrates an example that includes the merchant 102(1) sending data to the payment service 108 and in response, receiving recommendations from the payments service 108. FIG. 2 illustrates, for instance, an example where the POS device 104(1) of the merchant 102(1) is sending, to the payment service 108, data that includes transactional information 240 for the merchant 102(1), location information 242 for the merchant 102(1), and item information 244 for the merchant 102(1). In response to the merchant 102(1) sending the data to the payment service 108, the payment service 108 then determines a recommended number of gift cards for the merchant 102(1) to order (as discussed in FIG. 1) and sends, to the POS device 104(1), a gift card order recommendation 246 for that number of gift cards.

After receiving the gift card order recommendation 246 from the payment service 108, the merchant 102(1) may then use the POS device 104(1) to order the recommended number of gift cards from the payment service 108. For instance, the merchant 102(1) may use the merchant gift card interface 124 to order the recommended one hundred gift cards from the payment service 108. The POS device 104(1) may then send, to the payment service 108, a gift card order 248 for the one hundred gift cards.

Also illustrated in the example of FIG. 2, the payment service 108 may further send, to the POS device 104(1), a gift card values recommendation 250 for the merchant 102(1), where the gift card values recommendation 250 includes recommended values for the merchant 102(1) to associate with gift cards that customers purchase from the merchant 102(1). For instance, the gift card values recommendation 250 may include three different values for the merchant 102(1) to associate with the one hundred gift cards that the merchant 102(1) orders. The payment service 108 may determine the gift card values recommendation 250 based on the one or more business profiles 130 that are similar to the business profile of the merchant 102(1) and/or ticket sizes for the merchant 102(1). The merchant 102(1) may then recommend to customers that purchase the gift cards from the merchant 102(1) that the customers purchase the gift cards for one of the recommended values. For example, the merchant 102(1) may recommend that the customer 106 purchase the gift card 256 for one of the values that the payment service 108 recommends to the merchant 102(1) in the gift card values recommendation 250.

FIG. 2 further illustrates the POS device 104(1) of the merchant 102(1) sending, to the payment service 108, activation requests 252 for the gift cards. For instance, the POS device 104(1) may send one of the activation requests 252 to the payment service 108 each time a customer 106 purchases a gift card 256 from the merchant 102(1). The activation requests 252 may request that the payment service 108 activate the gift cards and further include a balance to associate with the gift cards (based on how much the customers purchase the gift cards for from the merchant 102(1)).

Additionally, the payment service 108 may send, to the POS device 104(1), a gift card display recommendation 254 for the merchant 102(1). For instance, the payment service 108 may recommend one or more display configurations for the merchant 102(1), where each of the display configurations includes instructions on how to display gift cards within the physical establishment of the merchant 102(1). The payment service 108 may determine the one or more recommended display configurations based on how other merchants display gift cards at the physical establishments of the other merchants. For instance, the payment service 108 may determine the one or more display configurations based on the one or more business profiles 130 that are similar to the business profile of the merchant 102(1).

Although not illustrated in FIG. 2, each of the merchant 102(2)-(5) may send and receive data with the payment service 108 that is similar to the data that the merchant 102(1) sends and receives with the payment service 108. For instance, each of the merchant 102(2)-(5) in possession of the POS device 104(2)-(5) may receive a gift card order recommendation, a gift card values recommendation, and a gift card display recommendation from the payment service 108.

Figure 3:
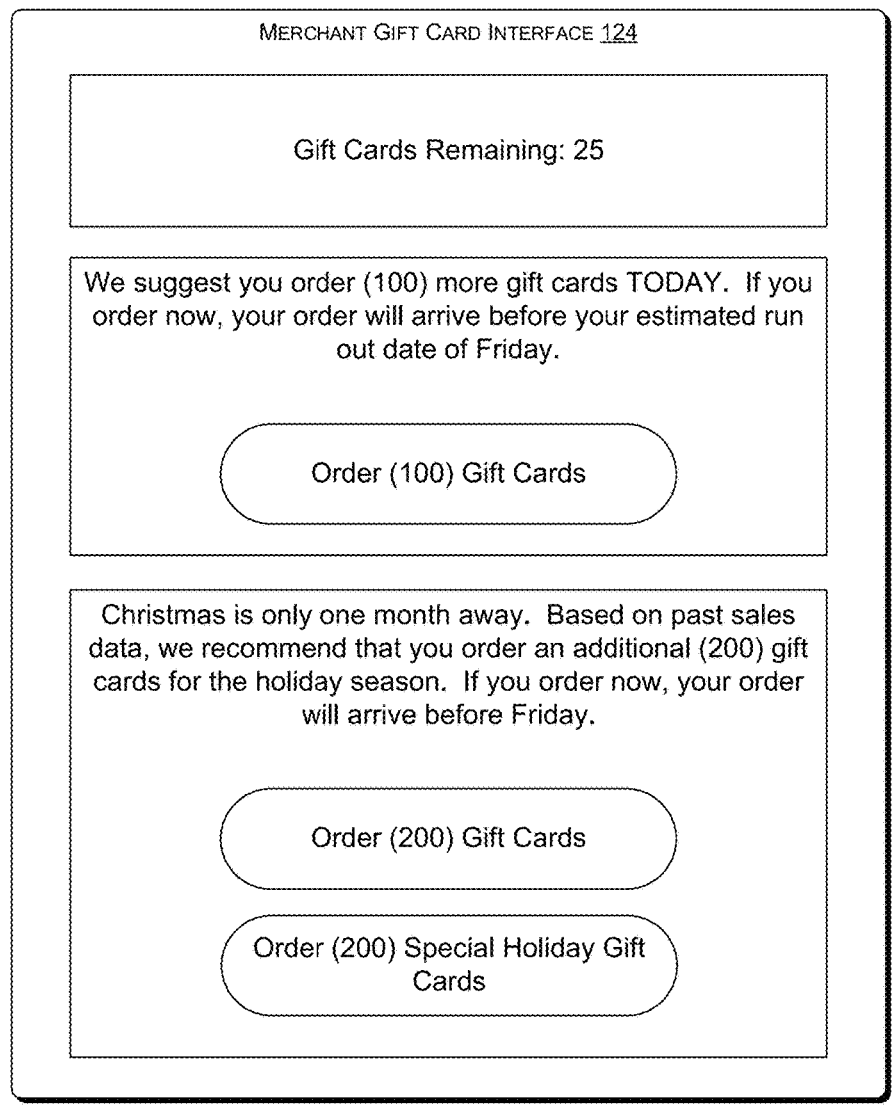
FIG. 3 illustrates an example user interface that a POS device of a merchant may display, where the user interface includes a recommendation to order additional gift cards.

FIG. 3 illustrates an example merchant gift card interface 124 that the POS device 104(1) of the merchant 102(1) may display, where the merchant gift card interface 124 includes a recommendation to order additional gift cards. FIG. 3 illustrates, for instance, an example where the payment service 108 sends a recommendation to the merchant 102(1) to order additional gift cards based on the payment service 108 identifying that the merchant 102(1) only has twenty-five gift cards remaining in stock. For example, the payment service 108 may have sent the recommendation to the merchant 102(1) so that the merchant 102(1) can order and receive the additional gift cards before Friday, which the payment service 108 estimates as the day that the merchant 102(1) will run out of gift cards.

The example of FIG. 3 further illustrates an example where the payment service 108 sends, to the POS device 104(1) of the merchant 102(1), a recommendation to order additional gift cards based on a special event. For instance, the payment service 108 recommends that the merchant 102(1) order an additional two hundred gift cards since Christmas is only a month away and gift card sales usually increase during the Christmas season. As the example of FIG. 3 illustrates, the merchant 102(1) is able to order two hundred additional gift cards and/or the merchant 102(1) is able to order two hundred Special Holiday Gift Cards, which may include a Christmas theme. Furthermore, if the merchant 102(1) does order the additional two hundred gift cards from the payment service 108, the merchant 102(1) will receive the additional two hundred gift cards before Friday.

Figure 4:
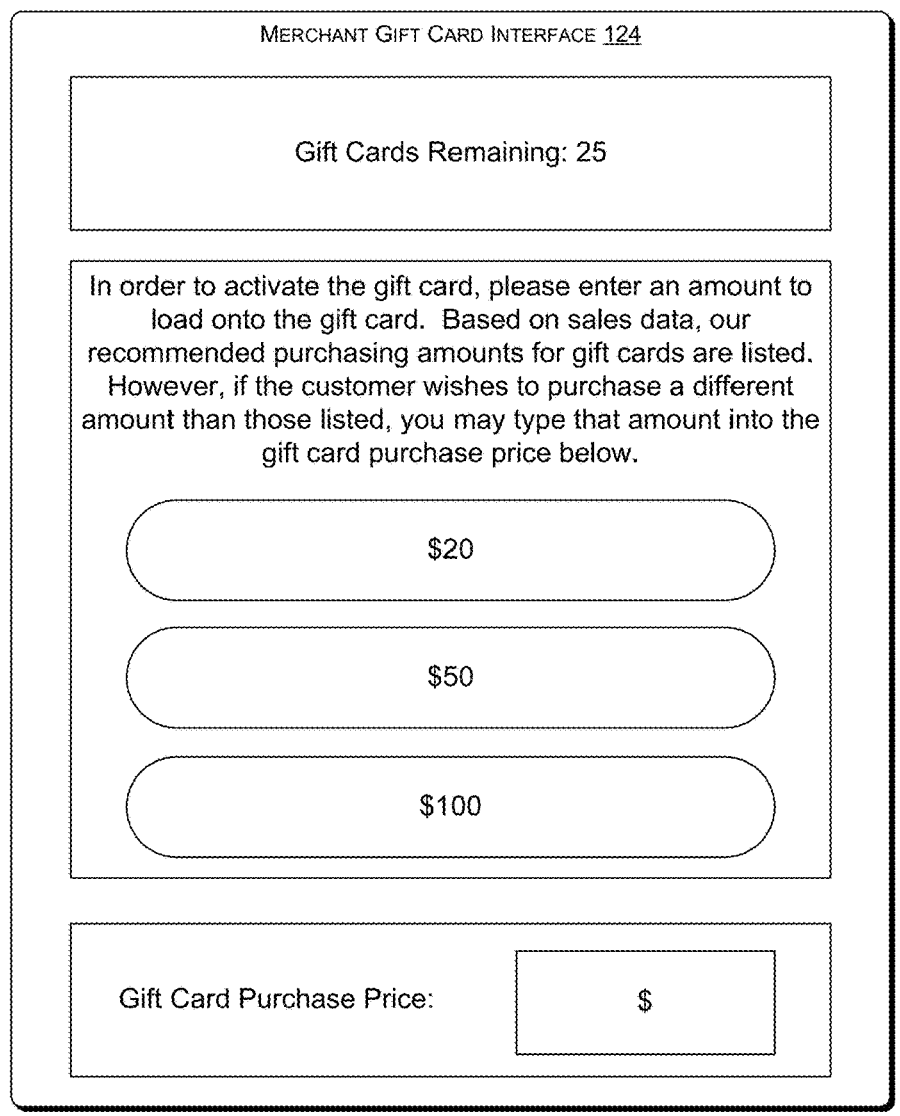
FIG. 4 illustrates an example of a user interface that a POS device of a merchant may display, where the user interface includes a recommendation for the merchant that includes different values to offer customers who purchase gift cards from the merchant.

FIG. 4 illustrates an example of a merchant gift card interface 124 that the POS device 104(1) of the merchant 102(1) may display, where the merchant gift card interface 124 includes recommended values for the merchant 102(1) to associate with gift cards. FIG. 4 illustrates, for instance, an example where the payment service 108 sends, to the POS device 104(1), recommended values for the merchant 102(1) to associate with gift cards that the merchant 102(1) offers to customers. As illustrated in FIG. 4, the merchant gift card interface 124 recommends that the merchant 102(1) offer to customers values of $20, $50, and $100 for gift cards. Additionally, the merchant gift card interface 124 includes a place to type in an additional amount if the customers do not want to purchase gift cards for the recommended values.

Moreover, the merchant gift card interface 124 of FIG. 4 may illustrate an example where the merchant 102(1) receives custom pre-printed gift cards. For instance, the payment service 108 may determine the recommended values of $20, $50, and $100 for the merchant 102(1) at the time of the merchant 102(1) ordering the gift cards. The merchant 102(1) may then receive one or more gift cards that come pre-printed with one or more of the $20, $50, or $100 recommended values. When selling one of the pre-printed gift cards to a customer 106, the merchant 102(1) will then only have to select which value of gift card the customer 106 is purchasing. For example, if the customer 106 is purchasing a pre-printed gift card with a value of $50, the merchant 102(1) will only have to select the $50 value using the merchant gift card interface 124.

Figure 5A:
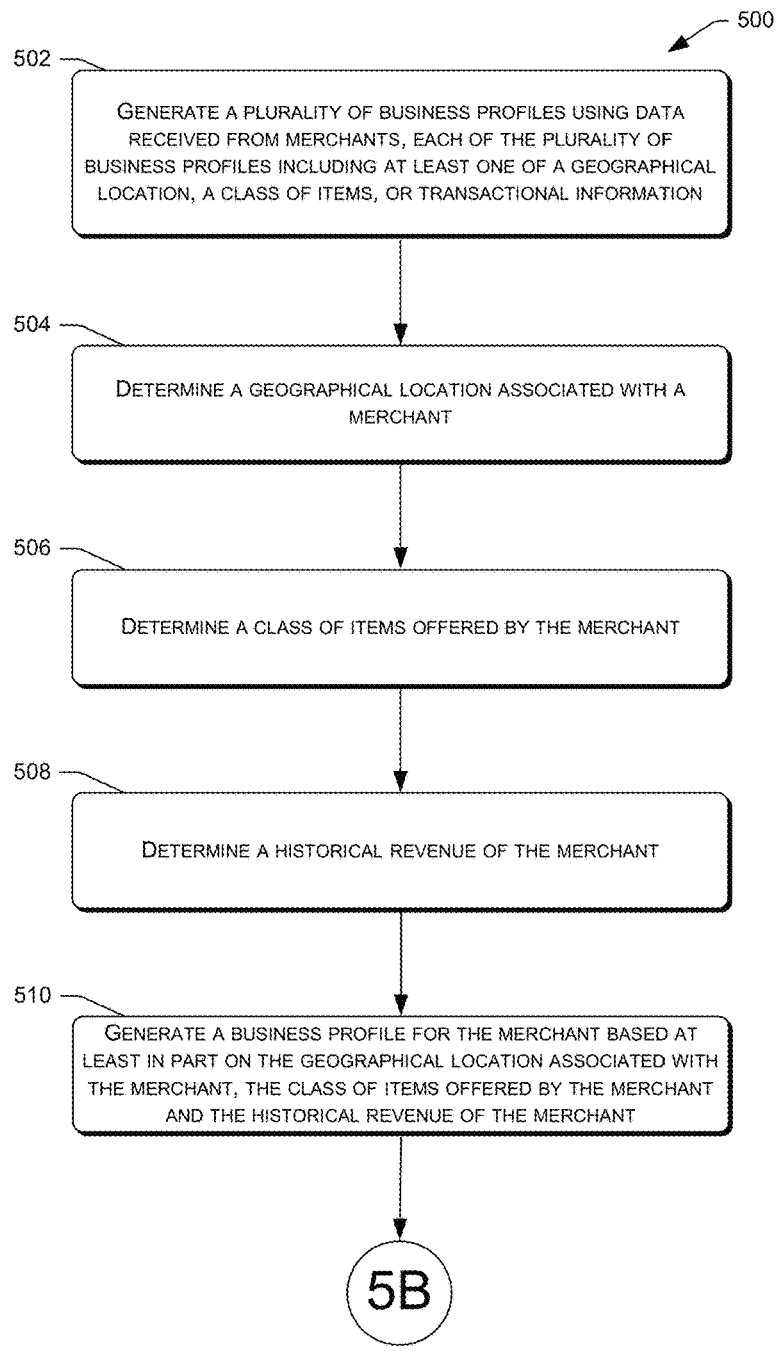
FIGS. 5A-5B illustrate a flow diagram of a process for determining a recommended number of gift cards for a merchant to order based on business profiles.
Figure 5B:
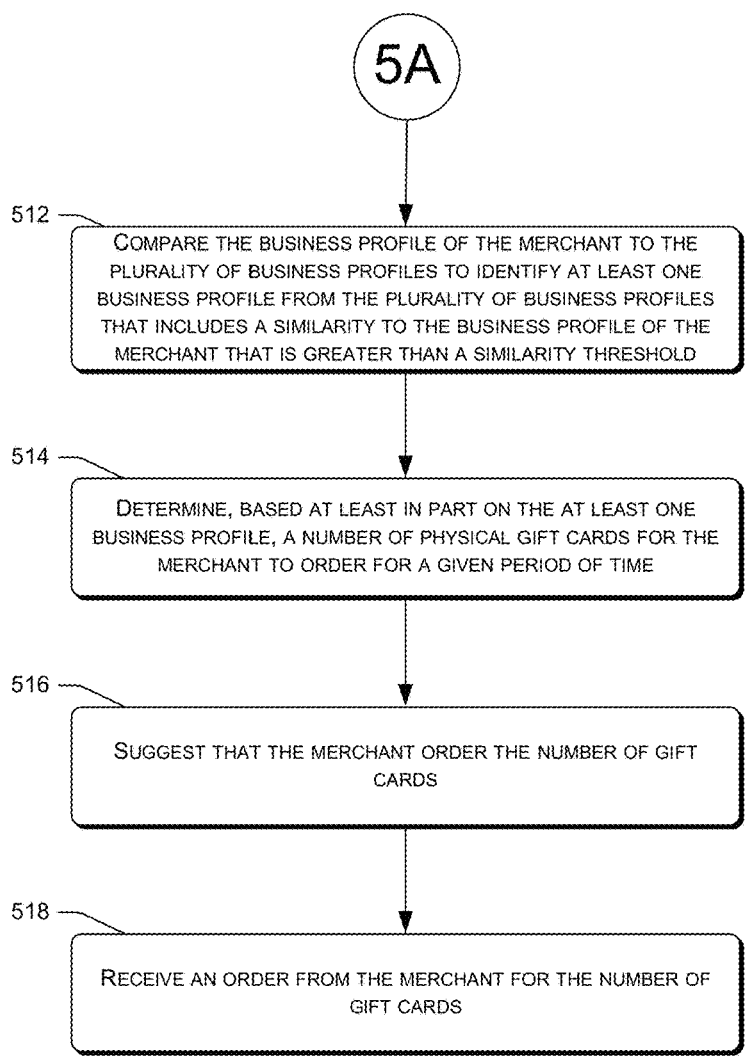

FIGS. 5A-5B illustrate a flow diagram of a process for determining a recommended number of gift cards for a merchant to order based on business profiles. The process 500 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 500, and other processes described herein, may be performed by a POS device, by a remote payment service (e.g., payment service 108), by another entity, or by a combination thereof.

At 502, the process 500 generates a plurality of business profiles using data received from merchants, each of the plurality of business profiles including at least one of a geographical location, a class of items, or transactional information.

At 504, the process 500 determines a geographical location associated with a merchant. At 506, the process 500 determines a class of items offered by the merchant. At 508, the process 500 determines a historical revenue of the merchant.

At 510, the process 500 generates a business profile for the merchant based at least in part on the geographical location associated with the merchant, the class of items offered by the merchant, and the historical revenue of the merchant.

At 512, the process 500 compares the business profile of the merchant to the plurality of business profiles to identify at least one business profile from the plurality of business profiles that includes a similarity to the business profile of the merchant that is greater than a similarity threshold. For instance, the payment service may identify the at least one business profile that includes the similarity to the business profile of the merchant that is greater than the similarity threshold based on the at least one business profile including one or more of the geographical location associated with the merchant, the class of items offered by the merchant, or a historical revenue that is within a threshold revenue (based on a percentage or range) as the historical revenue of the merchant.

At 514, the process 500 determines, based at least in part on the at least one business profile, a number of physical gift cards for the merchant to order for a given period of time. For instance, the number of gift cards may be determined based at least in part on an average number of gift cards that is ordered by merchants associated with the at least one business profile or an average number of gift cards that is sold by the merchants associated with the at least one business profile.

At 516, the process 500 suggests that the merchant order the number of gift cards and at 518, the process 500 receives an order from the merchant for the number of gift cards.

Figure 6:
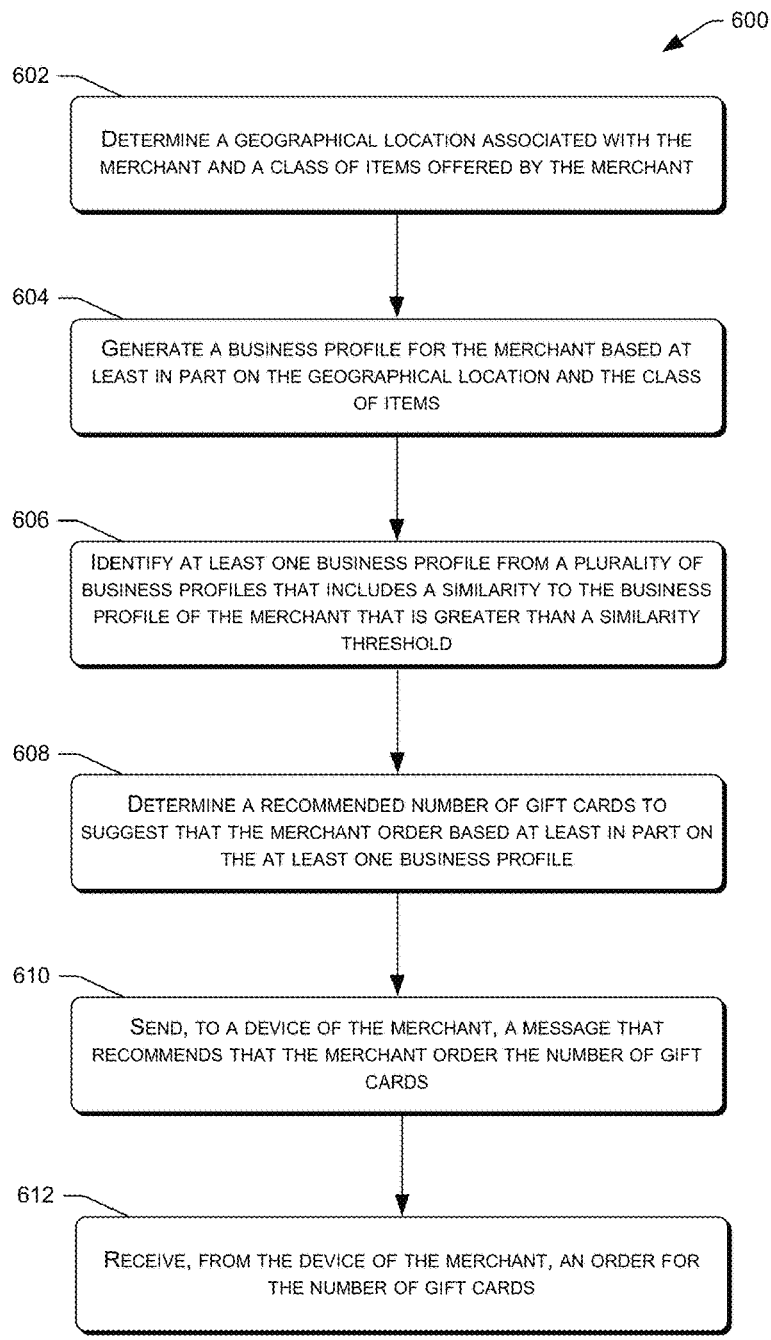
FIG. 6 illustrates a flow diagram of a process used by a payment service to recommend that a merchant order a number of gift cards.

FIG. 6 illustrates a flow diagram of a process used by a payment service to recommend that a merchant order a number of gift cards.

At 602, the process 600 determines a geographical location associated with the merchant and a class of items offered by the merchant. For instance, the payment service may receive, from a device of the merchant, the geographical location associated with the merchant and the class of items offered by the merchant. Additionally, the payment service may receive a historical revenue of the merchant from the device.

At 604, the process 600 generates a business profile for the merchant based at least in part on the class of items and the geographical location. Additionally, the payment service may generate the business profile based on the historical revenue of the merchant.

At 606, the process 600 identifies at least one business profile from a plurality of business profiles that includes a similarity to the business profile of the merchant that is greater than a similarity threshold. For instance, the at least one of business profile that includes a similarity to the business profile of the merchant that is greater than a similarity threshold may include the same geographical location as the business profile of the merchant and/or a similar class of items as the business profile of the merchant. Additionally, the at least one of business profile that includes a similarity to the business profile of the merchant that is greater than a similarity threshold may further include a historical revenue that is within a threshold revenue (based on a percentage or range) as the historical revenue of the merchant.

At 608, the process 600 determines a recommended number of gift cards to suggest that the merchant to order based at least in part on the at least one business profile. For instance, the payment service may determine the number of gift cards based at least in part on an average number of gift cards that is ordered by merchants associated with the at least one business profile or an average number of gift cards that is sold by the merchants associated with the at least one business profile.

At 610, the process 600 sends, to a device of the merchant, a message that recommends that the merchant order the number of gift cards. At 612, the process 600 receives, from the device of the merchant, an order for the number of gift cards.

Figure 7A:
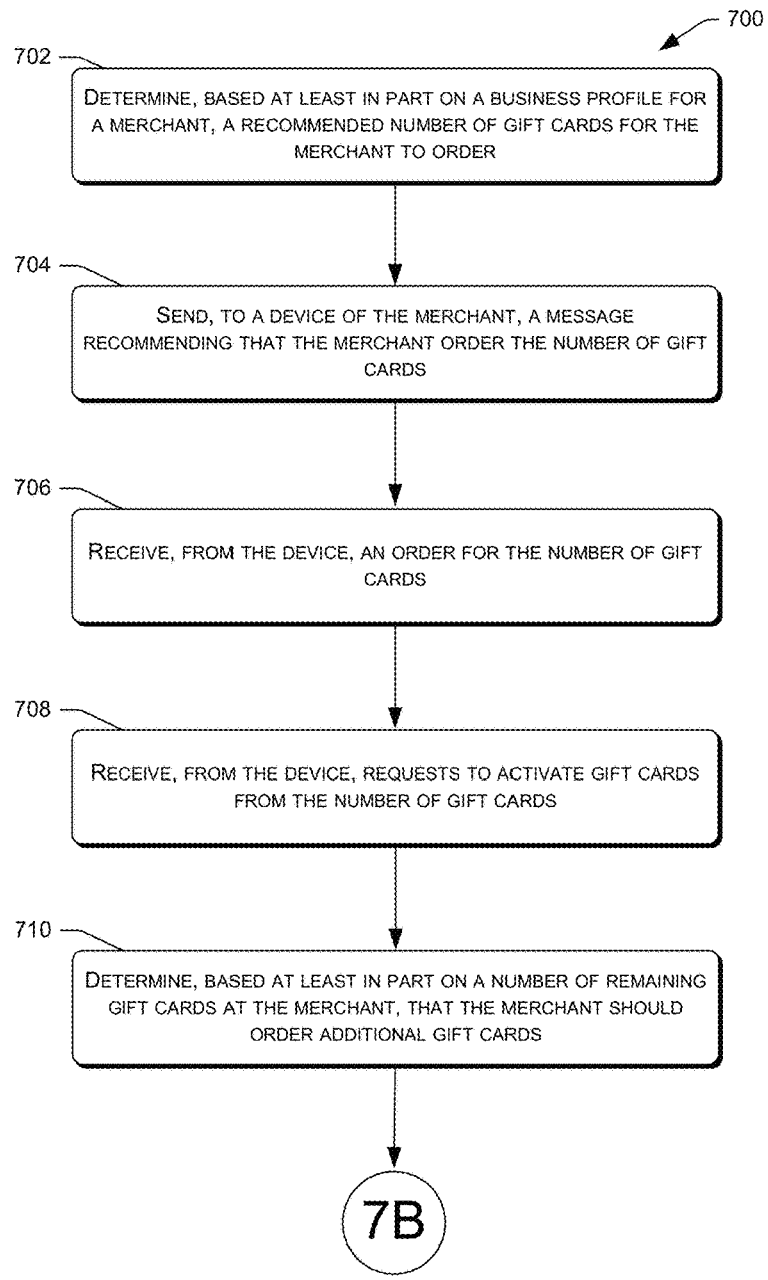
FIGS. 7A-7B illustrate a flow diagram of a process for a payment service to send, to a POS device of a merchant, a recommendation that the merchant order additional of gift cards.
Figure 7B:
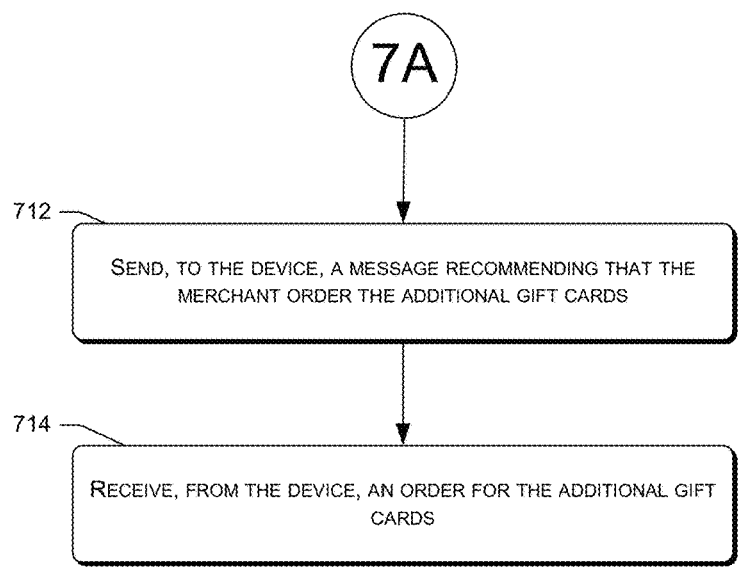

FIGS. 7A-7B illustrate a flow diagram of a process for a payment service to send, to a POS device of a merchant, a recommendation that the merchant order additional of gift cards.

At 702, the process 700 determines, based at least in part on a business profile for a merchant, a recommended number of gift cards for the merchant to order and at 704, the process 700 sends, to a device of the merchant, a message recommending that the merchant order the number of gift cards.

At 706, the process 700 receives, from the device, an order for the number of gift cards. At 708, the process 700 receives, from the device, requests to activate gift cards from the number of gift cards. For instance, the payment service may receive requests to activate gift cards each time the merchant sells a gift card to a customer using the POS device.

At 710, the process 700 determines, based at least in part on a number of remaining gift cards at the merchant, that the merchant should order additional gift cards. For instance, the payment service may determine a threshold number of gift cards for the merchant based on the number of remaining gift cards the merchant currently has in stock, the sales rate for gift cards at the merchant (such as sales per day, week, month, etc.), how long it takes to deliver gift cards to the merchant, and/or how long it is until the merchant receives his next recommendation for a gift card order (if the payment service sends the merchant suggested gift card orders at regular time intervals). The payment service may then determine that the merchant should order additional gift cards when the number of remaining gift cards at the merchant is below the threshold number of gift cards.

At 712, the process 700 sends, to the device, a message recommending that the merchant order additional gift cards and at 714, the process 700 receives, from the device, an order for the additional gift cards.

Figure 8A:
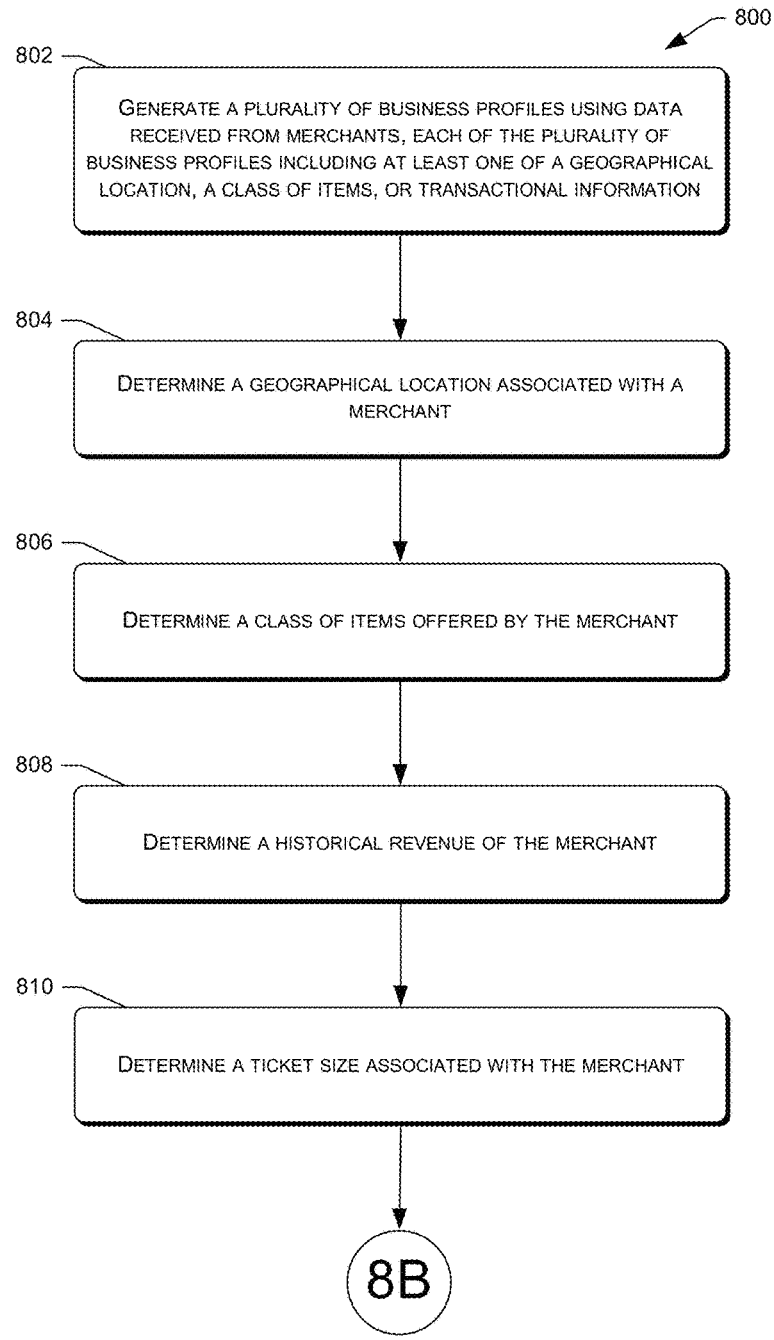
FIGS. 8A-8B illustrate a flow diagram of a process for a payment service to send, to a POS device of a merchant, recommended values to associate with gift cards.
Figure 8B:
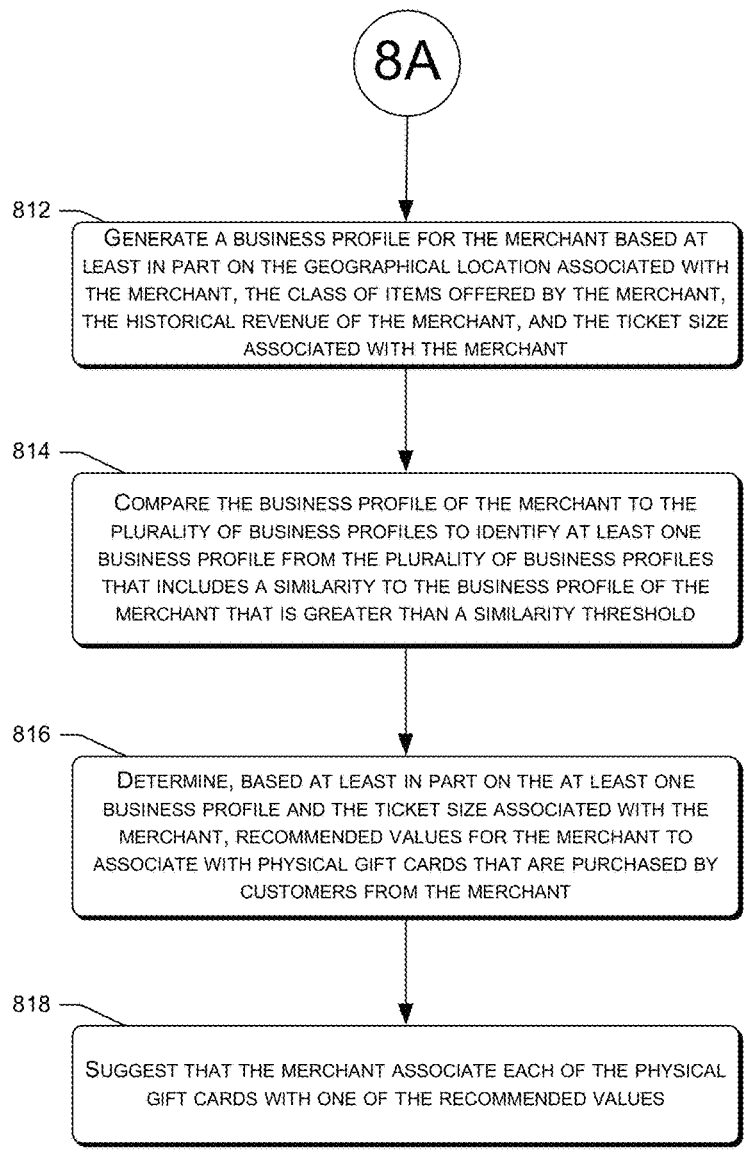

FIGS. 8A-8B illustrate a flow diagram of a process for a payment service to send, to a POS device of a merchant, recommended values to associate with gift cards.

At 802, the process 800 generates a plurality of business profiles using data received from merchants, each of the plurality of business profiles including at least one of a geographical location, a class of items, or transactional information. For instance, a payment service may receive the data from devices of the merchants and generate the business profiles using the data.

At 804, the process 800 determines a geographical location associated with a merchant. At 806, the process 800 determines a class of items offered by the merchant. At 808, the process 800 determines a historical revenue of the merchant. At 810, the process 800 determines a ticket size associated with the merchant. For instance, the payment service may receive, from a device of the merchant, data that includes the geographical location associated with the merchant, the class of items offered by the merchant, and transactional information for the merchant, such as the historical revenue of the merchant and the ticket size associated with the merchant.

At 812, the process 800 generates a business profile for the merchant based at least in part on the geographical location associated with the merchant, the class of items offered by the merchant, the historical revenue of the merchant, and the ticket size associated with the merchant. For instance, the payment service may generate the business profile for the merchant using the data received from the device of the merchant.

At 814, the process 800 compares the business profile of the merchant to the plurality of business profiles to identify at least one business profile from the plurality of business profiles that includes a similarity to the business profile of the merchant that is greater than a similarity threshold. For instance, the payment service may identify the at least one business profile that includes the similarity to the business profile of the merchant that is greater than the similarity threshold based on the at least one business profile including one or more of the geographical location associated with the merchant, the class of items offered by the merchant, or a historical revenue that is within a threshold revenue (based on a percentage or range) as the historical revenue of the merchant.

At 816, the process 800 determines, based at least in part on the at least one business profile and the ticket size associated with the merchant, recommended values for the merchant to associate with physical gift cards that are purchased by customers from the merchant. For instance, the payment service may determine the recommended values based at least in part on average values that merchants associated with the at least one business profile associate with gift cards that are purchased by customers from the merchants. Additionally, the payment service may determine the recommended values using at least one of a minimum ticket size, an average ticket size, a maximum ticket size, a median ticket size and/or a multiple of the maximum ticket size of the merchant.

At 818, the process 800 suggests that the merchant associated each of the physical gift cards with one of the recommended values. For instance, the payment service may send, to the device of the merchant, a message that includes the recommended values. The merchant may then recommend the values to customers that purchase gift cards from the merchant.

FIG. 9 illustrates select example components of an example POS device 900 according to some implementations. The POS device 900 may be any suitable type of computing device, e.g., mobile, semi-mobile, semi-stationary, or stationary. Some examples of the POS device 900 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 900 includes at least one processor 902, memory 904, a display 906, one or more input/output (I/O) components 908, one or more network interfaces 910, at least one card reader 912, at least one location component 914, and at least one power source 916. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the POS device 900, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the POS device 900 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, modules or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the POS device 900. Functional components of the POS device 900 stored in the memory 904 may include a merchant application 918, which may interact with applications executing on client devices to allow customers to pay for items offered by the merchant. The merchant application 918 may present an interface on the POS device 900 to enable the merchant to conduct transactions, receive payments, and so forth, as well as communicating with the payment service 108 for processing payments and sending transaction information. Further, the merchant application 918 may present an interface to enable the merchant to manage the merchant's account, and the like. Finally, the merchant application 918 may send data associated with the merchant to the payment service, and receive suggested gift card orders and values to associate with gift cards from the payment service.

Additional functional components may include an operating system 920 for controlling and managing various functions of the POS device 900 and for enabling basic user interactions with the POS device 900. The memory 904 may also store transaction data 922 that is received based on the merchant associated with the POS device 900 engaging in various transactions with customers, such as the example customer 106 from FIG. 1.

In addition, the memory 904 may also store data, data structures and the like, that are used by the functional components. For example, this data may include item information that includes information about the items offered by the merchant, which may include images of the items, descriptions of the items, prices of the items, and so forth. Depending on the type of the POS device 900, the memory 904 may also optionally include other functional components and data, which may include programs, drivers, etc., and the data used or generated by the functional components. Further, the POS device 900 may include many other logical, programmatic and physical components, of which those described are merely examples that are related to the discussion herein.

The network interface(s) 910 may include one or more interfaces and hardware components for enabling communication with various other devices over the network or directly. For example, network interface(s) 910 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the POS device 900 may include the display 906 mentioned above. Depending on the type of computing device used as the POS device 900, the display 906 may employ any suitable display technology. For example, the display 906 may be a liquid crystal display, a plasma display, a light emitting diode display, an OLED (organic light-emitting diode) display, an electronic paper display, or any other suitable type of display able to present digital content thereon. In some examples, the display 906 may have a touch sensor associated with the display 906 to provide a touchscreen display configured to receive touch inputs for enabling interaction with a graphic interface presented on the display 906. Accordingly, implementations herein are not limited to any particular display technology. Alternatively, in some examples, the POS device 900 may not include the display 906, and information may be present by other means, such as aurally.

The I/O components 908, meanwhile, may include speakers, a microphone, a camera, and various user controls (e.g., buttons, a joystick, a keyboard, a keypad, etc.), a haptic output device, and so forth.

In addition, the POS device 900 may include or may be connectable to a payment instrument reader 912. In some examples, the reader 912 may plug in to a port in the merchant device, such as a microphone/headphone port, a data port, or other suitable port. In other instances, the reader 912 is integral with the entire POS device 900. The reader 912 may include a read head for reading a magnetic strip of a payment card, and further may include encryption technology for encrypting the information read from the magnetic strip. Alternatively, numerous other types of card readers may be employed with the POS devices 900 herein, depending on the type and configuration of a particular POS device 900.

The location component 914 may include a GPS device able to indicate location information, or the location component 914 may comprise another other location-based sensor. The POS device 900 may also include one or more additional sensors (not shown), such as an accelerometer, gyroscope, compass, proximity sensor, and the like. Additionally, the POS device 900 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method implemented by one or more servers associated with a payment processing service that authorizes payment instruments of customers, the method comprising:
   receiving, from a plurality of merchant devices, first data associated with a plurality of merchants;
   generating a plurality of business profiles using the first data received from the plurality of merchant devices, each of the plurality of business profiles including at least one of a geographical location, a class of items, or transactional information;

receiving, from a merchant device of a first merchant, second data associated with the first merchant, the merchant device executing an instance of a merchant application that configures the merchant device as a point-of-sale (POS) terminal, the instance of the merchant application configuring the POS terminal to transmit at least the second data to the payment processing service;

determining, using the second data, a geographical location associated with the first merchant;

determining, using the second data, a class of items offered by the first merchant;

determining, using the second data, a historical revenue of the first merchant;

determining, using the second data, a ticket size associated with the first merchant;

generating a business profile for the first merchant based at least in part on the geographical location of the first merchant, the class of items offered by the first merchant, the historical revenue of the first merchant, and the ticket size associated with the first merchant;

comparing the business profile of the first merchant to the plurality of business profiles to identify at least one business profile from the plurality of business profiles that is associated with the geographical location associated with the first merchant, the class of items offered by the first merchant, and a historical revenue that is within a threshold revenue of the historical revenue of the first merchant;

based at least in part on the at least one business profile and the ticket size associated with the first merchant, determining recommended values for the first merchant to associate with physical gift cards that are purchased by the customers from the first merchant wherein a physical gift card is a prepaid stored-value monetary card in which at least a portion of the stored-value is deducted in association with a purchase;

transmitting, to the merchant application, a suggestion message that the first merchant associate each of the physical gift cards with a respective one of the recommended values, wherein the merchant application is configured to present, via a display of the POS terminal, a user interface associated with selectable controls corresponding to each of the recommended values;

receiving, from the merchant application and responsive to selection of a selectable control corresponding to a recommended value, a request to activate at least one physical gift card for the recommended value; and associating, based on receiving the request, at least one physical gift card with a stored-value corresponding to the recommended value.

2. A method as recited in claim 1, wherein at least one of the recommended values is determined based on values that customers purchase gift cards for at one or more merchants that are associated with the at least one business profile.

3. A method as recited in claim 1, wherein the ticket size associated with the first merchant is based at least in part on a minimum ticket size of the first merchant, an average ticket size of the first merchant, a median ticket size of the first merchant, a maximum ticket size for the first merchant, or a multiple of the maximum ticket size for the first merchant.

4. One or more computing devices of a payment processing service, comprising:
one or more processors; and
one or more computer-readable media storing computer executable instructions that, when executed on the one or more processors, cause the one or more processors to perform acts comprising:
receiving, from a merchant device, data associated with a merchant, the merchant device executing an instance of a merchant application that configures the merchant device as a point-of-sale (POS) terminal, the instance of the merchant application configuring the POS terminal to transmit at least the data to the payment processing service;
determining, based at least in part on the data, a class of items offered by the merchant;
determining, based at least in part on the data, a ticket size associated with the merchant;
generating a business profile for the merchant based at least in part on the class of items and the ticket size;
determining, using the business profile, at least one recommended value for the merchant to associate with one or more gift cards of the merchant, wherein a gift card is a prepaid stored-value monetary card in which at least a portion of the stored-value is deducted in association with a purchase;
causing a user interface to be presented via a display of the POS terminal, the user interface presenting a recommendation to associate the one or more gift cards with the at least one recommended value;
receiving, from the merchant application and responsive to an interaction with the user interface presented via the display of the POS terminal, a request to activate at least one gift card of the one or more gift cards for the at least one recommended value; and
associating a stored-value corresponding to the at least one recommended value with the at least one gift card.

5. One or more computing devices as recited in claim 4, wherein the ticket size associated with the merchant is based on at least one of a minimum ticket size of the merchant, an average ticket size of the merchant, a median ticket size of the merchant, a maximum ticket size of the merchant, or a multiple of the maximum ticket size of the merchant.

6. One or more computing devices as recited in claim 4, the acts further comprising:
identifying at least one business profile from a plurality of business profiles, the at least one business profile having a similarity to the business profile of the merchant that is greater than a threshold similarity; and
based at least in part on the at least one business profile, determining the at least one recommended value for the merchant.

7. One or more computing devices as recited in claim 6, wherein the at least one recommended value is based at least in part on values that customers purchase gift cards for at one or more merchants that are associated with the at least one business profile.

8. One or more computing devices as recited in claim 6, wherein the at least one recommended value is based at least in part on ticket sizes associated with one or more merchants that are associated with the at least one business profile.

9. One or more computing devices as recited in claim 8, wherein the at least one recommended value is based at least in part on at least one of a minimum ticket size, an average ticket size, a median ticket size, a maximum ticket size, or a multiple of the maximum ticket size for the one or more merchants that are associated with the at least one business profile.

10. One or more computing devices as recited in claim 4, the acts further comprising:

determining a geographical location associated with the merchant; and determining a historical revenue of the merchant;

and wherein the business profile for the merchant is further based at least in part on the geographical location associated with the merchant and the historical revenue of the merchant.

11. A device comprising:

one or more processors; and one or more computer-readable media storing instructions executable by the one or more processors, wherein the instructions, when executed, cause the one or more processors to:

send, to one or more servers associated with a payment processing service, item data indicating a class of items offered by a merchant associated with the device;

send, to the one or more servers associated with the payment processing service, ticket data indicating a ticket size of the merchant;

receive, from the one or more servers associated with the payment processing service, a message that indicates at least one recommended value for the merchant to associate with one or more gift cards offered by the merchant, the at least one recommended value based at least in part on the class of items offered by the merchant and the ticket size of the merchant, wherein a gift card is a prepaid stored-value monetary card in which at least a portion of the stored-value is deducted in association with a purchase;

present, via a display of the device, a user interface that enables the merchant to activate the one or more gift cards, the user interface including at least one graphical element representative of the at least one recommended value;

receive an input associated with a selection of the at least one graphical element; and send, to the one or more servers associated with the payment processing service and responsive to receiving the input, a request to activate a particular gift card of the one or more gift cards for the at least one recommended value.

12. A device of claim 11, wherein the ticket size of the merchant is based at least in part on at least one of a minimum ticket size of the merchant, an average ticket size of the merchant, a median ticket size of the merchant, a maximum ticket size of the merchant, or a multiple of the maximum ticket size of the merchant.

13. A device of claim 11, wherein the at least one recommended value is based at least in part on at least one of a minimum ticket size, an average ticket size, a median ticket size, a maximum ticket size, or a multiple of the maximum ticket size for one or more merchants that are associated with at least one business profile that has been deemed similar to the business profile of the merchant.

14. A device of claim 11, wherein the at least one recommended value is based at least in part on values that similar merchants associate with gift cards that are purchased by customers from the similar merchants.

15. A device of claim 11, wherein the instructions, when executed, further cause the one or more processors to:

send, to the one or more servers associated with the payment processing service, a geographical location associated with the merchant; and send, to the one or more servers associated with the payment processing service, a historical revenue of the merchant, and wherein the at least one recommended value is further based at least in part on the geographical location associated with the merchant and the historical revenue of the merchant.

16. A method as recited in claim 1, further comprising:

receiving, from the merchant application, an order for the physical gift cards; and causing the order to occur for the physical gift cards for the merchant.

17. One or more computing devices as recited in claim 4, the acts further comprising:

receiving, from the merchant application, an order for the one or more gift cards; and causing the order to occur for the one or more gift cards for the merchant.

18. One or more computing devices as recited in claim 4, wherein the user interface includes at least one selectable control corresponding to the at least one recommended value and the interaction comprises an actuation of the at least one selectable control.

19. One or more computing devices as recited in claim 4, wherein the request is associated with a plurality of gift cards, and the acts further comprise associating each gift card in the plurality of gift cards with the stored-value corresponding to the at least one recommended value.

20. One or more computing devices as recited in claim 4, wherein prior to causing the user interface to be presented via the display of the POS terminal, the acts further comprise:

receiving, from the merchant application, an identifier of a customer purchasing the at least one gift card;

accessing customer data associated with the customer; and modifying the at least one recommended value based at least in part on the customer data.

\* \* \* \* \*